Patented Sept. 1, 1953

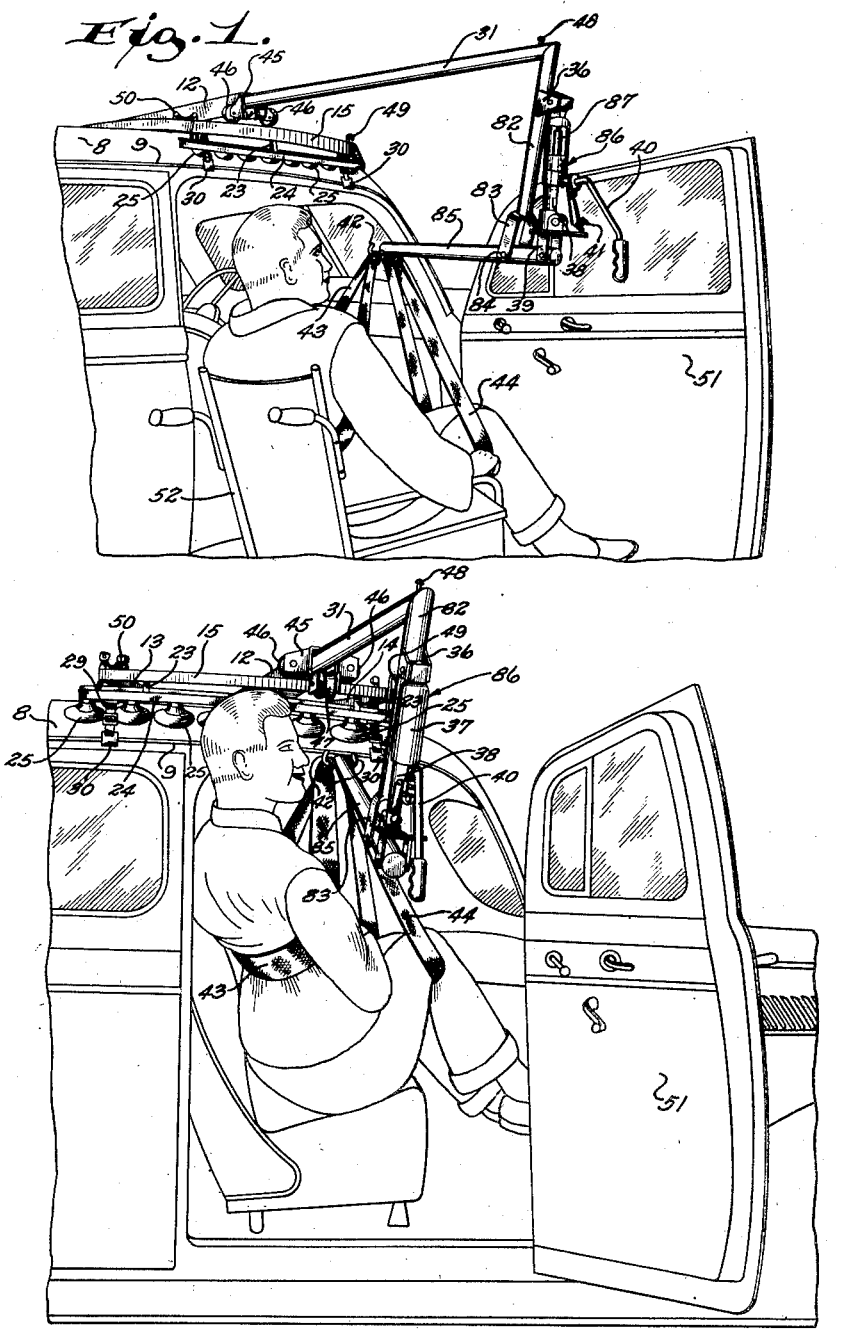

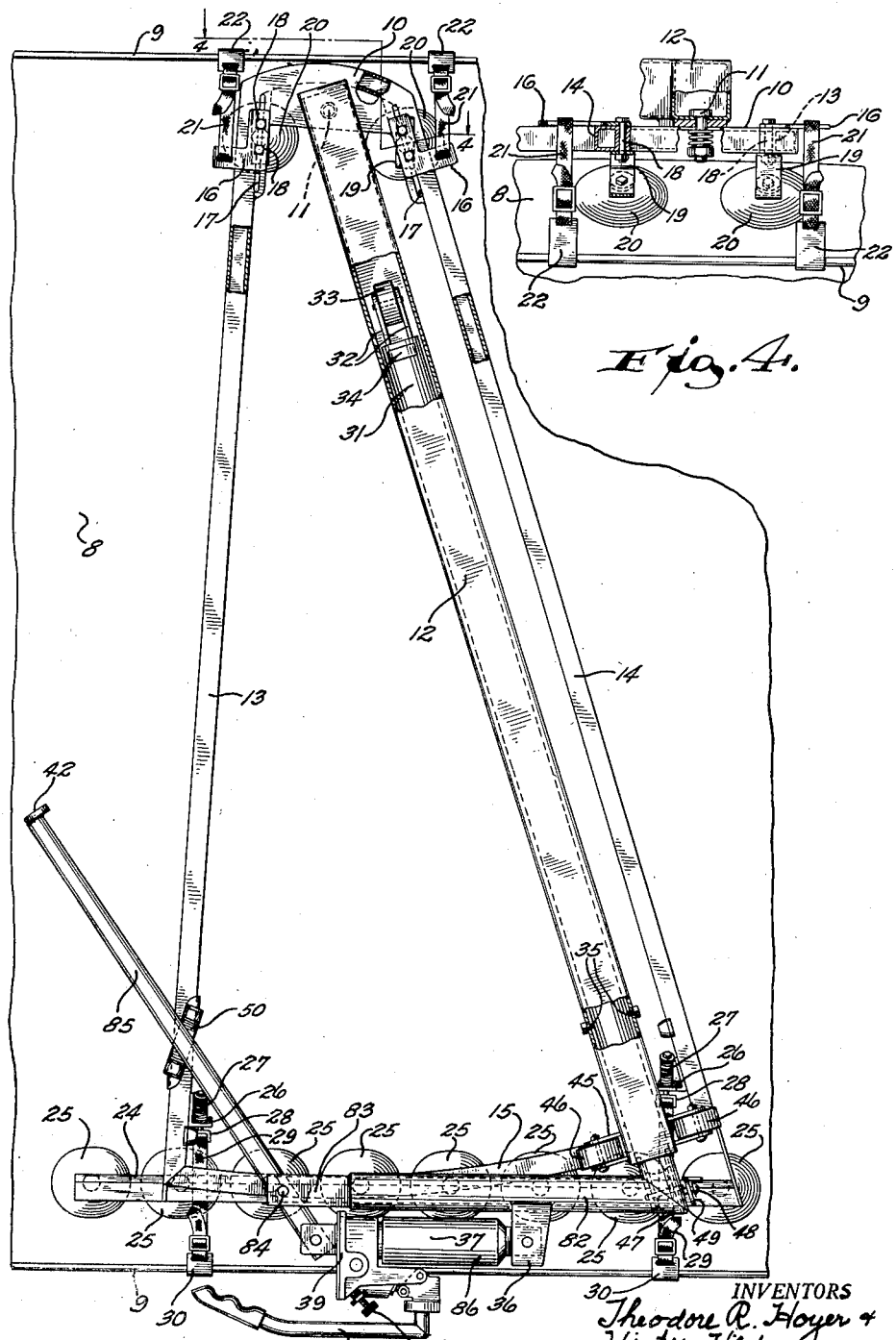

2,650,725

UNITED STATES PATENT OFFICE 2,650,725

MOTOR VEHICLE INVALID LIFT

Theodore R. Hoyer and Victor Hildemann,
Oshkosh, Wis.

Application September 12, 1951, Serial No. 246,253

9 Claims. (Cl. 214—75)

This invention relates to improvements in motor vehicle invalid lifts.

Many incapacitated or physically handicapped persons are prevented from being transported in motor vehicles, either for pleasure or for necessary trips, because of the difficulty of transferring the person from a support such as a wheelchair into the motor vehicle, and vice-versa. For persons who are paralyzed and unable to assist in a transfer of position the movement into and out of a motor vehicle heretofore had to be accomplished through the physical effort of an attendant or aid in bodily lifting and transferring the incapacitated person. The limitations in this type of transfer are obvious as it depends upon the availability and physical strength of a person or persons for thus handling and transferring the invalid.

With the foregoing in mind it is the primary object of the present invention to provide an invalid lift adapted to be mounted on and carried by an automobile or motor vehicle top and arranged to be easily operated by a single person without undue physical effort to effect the easy and safe transfer of an invalid from a wheelchair or the like into a motor vehicle, and the reverse.

A further object of the invention is to provide a car top carried invalid lift and transfer mechanism which, in its inoperative position is compactly disposed and secured in a semi-collapsed condition on the top of an automobile within the boundaries thereof, but which may be easily adjusted to operative position wherein the adjustable boom and lift arm portions of the mechanism are movably disposed laterally of the automobile to permit the support of an invalid and the transfer of the invalid through the automobile door.

A further object of the invention is to provide a car top carried invalid lift and transfer which is susceptible of movement both longitudinally and transversely of the vehicle, as well as vertically, whereby a patient being suspended from said lift can be shifted from a wheelchair to the automobile seat without movement on the part of the patient and without undue physical effort and lifting on the part of the attendant.

A further object of the invention is to provide a motor vehicle invalid lift having readily engageable and disengageable strap means for supporting the patient, the lift mechanism being easily operated by a manually manipulated hydraulic jack.

A further object of the invention is to provide a motor vehicle invalid lift readily mountable on or demountable from a car top and which can be safely affixed to the car top solely by suction cups and hooks engaging under the car drip rail whereby the car top will remain uninjured and unmarred.

A further object of the invention is to provide a motor vehicle invalid lift which is adapted to remain on the automobile to go wherever the car goes and thus be ready for instant use at any place with respect to lifting an incapacitated person into and out of an automobile so equipped.

A further object of the invention is to provide a motor vehicle invalid lift of the character described equipped with detachable straps arranged to be conveniently engaged with separated portions of a person's body and to support the body for lifting and transferring movements in a novel manner.

A further object of the invention is to provide a motor vehicle invalid lift which may be securely and conveniently associated with and carried by a top or roof of a motor vehicle, which is strong and durable and simple to operate, which is neat and attractive and compact in its mounted condition, and which is well adapted for the purposes described.

With the above and other objects in view the invention consists of the improved motor vehicle invalid lift, and its parts and combinations as set forth in the claims, and all equivalents thereof.

In the accompanying drawings in which the same reference characters indicate the same parts in all of the views:

Fig. 1 is a fragmentary side perspective view of an automobile equipped with the improved invalid lift showing the same in its laterally extended condition and arranged to commence the elevation and transfer of a physically handicapped person from a wheelchair adjacent the side of an automobile into the automobile;

Fig. 2 is a fragmentary perspective view similar to Fig. 1 only showing the position of the lift after it has elevated a patient and is in position to move inwardly so as to transfer the patient into the automobile and to lower him onto the automobile seat;

Fig. 3 is an enlarged fragmentary plan view of an automobile top showing the improved invalid lift mounted thereon and arranged in its semi-collapsed inoperative position, parts being broken away and in section to show structural details; and Fig. 4 is an enlarged fragmentary detail sectional view taken on line 4—4 of Fig. 3.

Referring now more particularly to the drawings, the numeral 8 indicates the hard top of a conventional automobile or motor vehicle having at the upper end of each side of the automobile conventional gutters or drip rails 9.

As will appear most clearly from Fig. 3 the improved vehicle invalid lift is adapted to be mounted on the hard top 8 of an automobile, transversely thereof, and above the front compartment of the motor vehicle. This device may be broadly described as a "crane" which is borne by a vehicle roof for the lifting and transferring of human beings relative to a side door of the vehicle. In its semi-collapsed inoperative position the lift or crane, when mounted, is disposed as shown in Fig. 3 and the major portion thereof is completely confined between the opposite gutters 9 of the car top.

A relatively flat frame, of substantially triangular contour is secured horizontally on the vehicle top 8, providing an anchored support for the moving parts of the lift or crane. The narrowest end of said supporting frame is positioned adjacent the vehicle side opposite the side to be utilized for the handling of the patient or person to be lifted and transferred by the crane. As will appear from Figs. 3 and 4 said narrow side portion of the frame includes a sturdy metallic plate 10 having mounted on an intermediate portion of its top face by a pivot bolt 11, the inner end of an elongated sleeve 12 which is of substantially square form in cross section. Said sleeve is adapted to be swung on the bolt 11 to move in a gradual arc in a direction longitudinally of the vehicle top 8. Said plate 10 has integral with its end portions frame bars 13 and 14 which, as they extend away from said plate 10, are divergent and are secured to, at the opposite side of the vehicle top, a curved track 15 which completes the outline of the frame.

Small angled adjustment plates 16 overlie the inner ends of said bars 13 and 14, the latter having slots 17 into which the shanks of bolts 18 adjustably extend. Carried by the depending ends of said bolts 18 below the bars 13 and 14 and plate 10 are shoes 19 carrying depending suction cups 20. Angled extremities of the adjustment plates 16 adjustably carry straps 21 having at their free ends metal hooks 22 arranged for engagement under the adjacent vehicle top drip rail or gutter 9.

It will be obvious that when said supporting frame is mounted transversely on the top 8 of a motor vehicle the adjustment plates 16 permit a disposition of the suction cups 20 a proper distance inwardly of the adjacent drip rail 9. When the proper adjustment is made nuts on the shanks of the bolts 18 are tightened and the metal hooks 22 are engaged under the drip rail 9 with the straps 21 then being tightened.

As was mentioned heretofore, the wide side of the frame is closed by a curved track 15 which is carried by the adjacent ends by the bars 13 and 14. Spacedly mounted below the track 15 by means of webs 23 is a rigid suction cup supporting bar 24 having spacedly depended from its undersurface a plurality of suction cups 25. The end portions of the diverging bars 13 and 14, adjacent the track 15, carry brackets 26 which resiliently mount coiled springs 27 associated with loops 28 to which adjustment straps 29 are secured. The latter carry metal hooks 30 to engage under the adjacent drip rail 9 along that side of the vehicle top 8. Said suction cups 25 are, therefore, engaged with the top 8 of the vehicle, the hooks 30 are engaged under the adjacent drip rail 9 and the straps 29 are tightened against the force of the springs 27 and thus, with the narrow side of the frame adjustably mounted as previously described, the complete mounting of the device on the automobile top is effected.

The numeral 31 designates the main arm portion of a boom of circular form in cross section, which is telescopically mounted within the sleeve 12. The inner end of said boom arm carries plates 32 (see Fig. 3) between which a roller 33 is journaled which, for extensile and retractile movements of the boom, is adapted to ride on inner portions of the sleeve 12 to facilitate longitudinal movement of the boom. On opposite sides of the arm 31 of the boom, adjacent its inner end, are small plates 34 which form shoulders. When the boom is positioned in the manner shown in Fig. 3 it may be withdrawn and completely removed from the sleeve 12, but when the arm 31 of said boom is turned therefrom through an angle of 90 degrees, upon extension of the boom relative to the sleeve 12, the plates 34 will ultimately contact bolts 35 projecting inwardly from the sides of the sleeve 12 adjacent its outer end to thus limit the extensile movement of the boom and to prevent its complete withdrawal from the sleeve when turned as described.

The boom also includes an angularly disposed arm 82 which is integral with the outer end of the boom arm 31 and which forms an acute angle with said boom arm 31. The outer end portion of said boom arm 82 is provided with a U-bracket 83 supporting a transverse pin 84 on which a lifting arm or lever 85 is pivotally mounted intermediate its ends. The arm 82 of the boom, toward its inner end also carries a bifurcated bracket 36 pivotally supporting one end of a protective casing 37 forming part of an hydraulic jack assemblage designated generally by the numeral 86. Operatively associated with the outer end of the movable cylinder 38 of the hydraulic jack is a bracket 39 to which the inner end of the lifting lever 85 is pivotally attached. The hydraulic jack includes a hand lever 40 which can be manually operated to force hydraulic fluid against the jack piston 87 (see Fig. 1) whereby the relatively movable cylinder 38 is projected, it being noted that said piston is anchored. A valve 41, when turned to open position, releases the fluid pressure permitting retraction of the cylinder relative to the piston and opposite movement of the lift arm 85 in response to the force of a weight acting on its outer end. The outer end of the lift arm is provided with a pair of hooks 42 to detachably receive the rings at the opposite ends of a pair of body engaging lifting straps 43 and 44. While an hydraulic jack has been shown and described it is obvious that any type of conventional jack may be utilized.

Rigidly mounted on the outer end of the sleeve 12 is a bearing truck 45 which permits the mounting on opposite sides of the sleeve of rollers 46 to ride on the top surface of the track 15, and a roller 47 which supports the arm 31 of the boom and facilitates extensile and retractile movements thereof. The axis of the roller 47 is at right angles to the axes to the rollers 46.

In the noted condition of the improved invalid lift or crane relative to the top 8 of an automobile, best shown in Fig. 3, and wherein the demountable detachment of the supporting frame is accomplished through the various suction cups 20 and 25 and the metal hooks 22 and 30, the boom is normally adapted to occupy a semi-collapsed position wherein it is flatly supported by the frame and is substantially confined between the opposite sides of the vehicle top. For this disposition, the boom is revolved relative to the sleeve 12 so as to dispose the angular boom arm 82 and the lifting lever 85 in approximately the same horizontal plane with the telescoped arm 31 of the boom, the latter being in its fully retracted position relative to the sleeve 12. To prevent undesired extension of the boom relative to the sleeve, a shouldered pin 48 on the outer end of the boom arm 31 is engaged in a hook-like bracket 49 projecting upwardly from the forward end of the track 15. The side bar 13 of the frame has mounted thereon a cushioned stirrup 50 which engages an intermediate portion of the angularly directed lifting arm 85 in the manner shown in Fig. 3. With the motor vehicle invalid lift arranged as described and shown in Fig. 3 in its semi-collapsed inoperative position, the lift assumes a compact, unobtrusive position on the top of the automobile but is available for use at any time.

When it is desired to use the improved invalid lift or crane, the lifting lever 85 is raised out of its supporting stirrup 50 and the boom arm 82 is also swung in a clockwise direction relative to Fig. 3 sufficiently far to disengage the shouldered pin 48 from the hook 49, whereupon the boom may then be extended relative to the sleeve 12. The extension of the boom should, however, take place after the front door 57 of the motor vehicle, opposite the driver's position, has been fully opened, as shown in Figs. 1 and 2. Assuming that it is desired to lift and transfer an invalid or a disabled person from a wheel chair 52 into the front seat of the automobile, the wheelchair with the person therein is disposed adjacent the open doorway of the automobile, as shown in Fig. 1, or slightly rearwardly thereof. The boom is extended relative to its sleeve 12 so as to substantially overhang the adjacent side of the automobile and it is also turned relative to the sleeve to direct the boom arm 82 downwardly and the lift arm 85 substantially horizontally. By extensile or retractile movements of the boom and by swinging the sleeve (which carries the boom) on its pivotal mounting 11, the lift arm 85 may be brought over the lap of the wheelchair invalid who is to be moved. The swinging movement of the sleeve and boom fore and aft of the car top is, of course, facilitated by the rollers and track 15.

While the incapacitated person is seated in a wheelchair or is otherwise supported exteriorly of the open doorway of the automobile, the straps 43 and 44 are engaged with the person in the manner shown in Fig. 1. One strap is slipped under the arms and around the back of the patient while the other strap is slipped under the patient's knees. The rings or loops at the ends of both straps are then engaged with the two hooks 42 on the outer end of the fulcrumed lifting lever 85. The attendant next operates the handle 40 of the hydraulic jack to project the jack piston and thereby elevate the free end of the lever 85, and in so doing, the patient is lifted out of the wheelchair or other support by the harness straps 43 and 44. Next, the sleeve 12, carrying the extended boom is swung so as to aline the lifted patient with the door opening and the jack may be operated to elevate the patient above the level of the automobile seat. The boom 31, and parts carried thereby, is next pushed inwardly or retracted relative to the sleeve and this carries the outer end of the lever 85 and the supported patient through the doorway into the automobile and over the seat. This positioning may require some movement of the patient's head to clear the car top and positioning of the patient's legs by the attendant to dispose the same within the seat compartment and below the car dash. When the patient is thus properly disposed, the valve 41 of the hydraulic hoist is turned to relieve the pressure against the piston 38, whereupon the weight of the patient acting on the outer end of the fulcrumed lever 85 will lower the outer end of the lever and easily drop the patient into a proper position on the automobile seat. Thereupon the straps 43 and 44 are disengaged from the lever 85 and are removed from the patient. The boom is then extended and turned so that its angular arm 82 and the lever 85 are in the same horizontal plane, whereupon the boom is pushed inwardly and the operative parts of the crane are then disposed compactly on the top of the automobile in the secured position shown in Fig. 3 and previously described. After the automobile has reached its destination the patient is easily removed from the automobile through the open door and deposited into a wheelchair or support exteriorly of the automobile by a reverse procedure, following which the crane is again disposed in its semi-collapsed position on the top of the automobile to go wherever the automobile goes for duty in lifting and transferring an incapacitated person at any place.

The crane or lift is exceedingly easy to operate and manipulate and the novel strap arrangement through which the incapacitated person is engaged under the arms and under the knees permits easy application of the lifting straps or harness to the patient and disengagement of the same from the patient without requiring the patient to move or shift relative to his support.

The improved motor vehicle invalid lift is furthermore of simple and novel construction and is well adapted for the purposes set forth.

What is claimed as the invention is:

1. In combination with a motor vehicle top, a support detachably mounted in a horizontal plane thereon, a sleeve mounted on said support for movement longitudinally of said vehicle top, a boom telescopically and revolubly associated with said sleeve for projection and retraction laterally of said vehicle top in a horizontal plane and for flat collapse on the vehicle top, and a lift arm movably carried directly by the outer end of said boom.

2. In combination with a motor vehicle top, a supporting frame mounted transversely thereon, a sleeve pivotally mounted at its inner end on one marginal portion of said support for arcuate movement longitudinally of said vehicle top, a boom telescopically associated with said sleeve for projection and retraction laterally of said vehicle top, a rigid lift arm movably carried by the outer end of said boom, and body engaging members detachably carried by said lift arm.

3. In combination with the hard top of a side door motor vehicle, a support mounted thereon, a sleeve mounted on said support for movement longitudinally of said vehicle top, a boom telescopically associated with said sleeve for projection and retraction laterally of said vehicle top, a lift arm movably carried by an outer portion of said boom, and a hydraulic jack mounted on the boom and extending to said lift arm for operating the latter.

4. In combination with a motor vehicle top, a support mounted thereon, and a human being crane operatively carried by said support, said crane comprising a sleeve mounted on said support for movement generally longitudinally of said vehicle top, a boom telescopically associated with said sleeve for projection and retraction laterally of said vehicle top, a lift arm movably carried by an outer portion of said boom, and a manually operable jack extending to said lift arm for operating the latter, there being means on the support for holding the crane in an inoperative retracted position thereon substantially within the boundaries of the vehicle top.

5. In combination with a motor vehicle top, a support mounted thereon, and a human being crane operatively carried by said support, said crane comprising a sleeve mounted on said support for swinging movement generally longitudinally of said vehicle top, a boom telescopically associated with said sleeve for projection and retraction laterally of said vehicle top, anti-friction means between the sleeve and support, anti-friction means between the sleeve and boom, a lift arm movably carried by an outer portion of said boom for operation in a vertical plane, a manually operable jack extending to said lift arm for operating the latter, and body engaging harness members removably depended from said lift arm.

6. In combination with a motor vehicle top, a support mounted transversely thereon, a transversely extending sleeve pivotally mounted at one end on one side of said support for swinging movement generally longitudinally of said vehicle top, an arcuate track carried by the other side of said support, rollers mounted on the outer end of said sleeve and riding on said track, a boom telescopically and turnably associated with said sleeve for projection and retraction laterally of said vehicle top adjacent the track, said boom having at its outer end an angularly directed arm, a lift lever fulcrumed on said boom arm for operation in a vertical plane, a manually operable jack extending to said lever for operating the latter and body engaging harness members removably depended from said lever.

7. An automobile top crane for transferring an incapacitated human into and out of the automobile interior via a side door and adapted to be mounted on the hard top of an automobile, comprising a sleeve swingable fore and aft in a horizontal plane, a boom telescoped within said sleeve for extension and retraction relative to the sleeve and for turning movement therein; said boom having an angularly projecting arm, a lever fulcrumed on said arm, an hydraulic jack mounted on said boom and engaging said lever to move it, and body supporting members carried by said lever.

8. A crane for transferring an incapacitated human into and out of the interior of an automobile via a side door and adapted to be removably mounted on the automobile top, comprising a sleeve swingable fore and aft in a horizontal plane, a boom telescoped within said sleeve for extension and retraction relative to the sleeve and for turning movement therein; said boom having an angularly projecting arm which in operative position will overhang a side of the automobile, a lever fulcrumed on said arm to move in a vertical plane, a jack operatively associated with said lever to move it, and human body supporting members carried by said lever.

9. An automobile top crane for transferring an incapacitated human into and out of the automobile interior via a side door and adapted to be mounted on the hard top of an automobile, comprising a sleeve swingable fore and aft in a horizontal plane, a boom telescopically associated with said sleeve for extension, retraction and turning movement relative to the sleeve, said boom having an angularly projecting arm, a lifting lever fulcrumed on said arm, and a jack engaging said lever to move it.

THEODORE R. HOYER,
VICTOR HILDEMANN.

References Cited in the file of this patent

UNITED STATES PATENTS

| Number | Name | Date |
|---|---|---|
| 274,527 | Steele et al. | Mar. 27, 1883 |
| 1,717,303 | Barclay | June 11, 1929 |
| 1,755,785 | McCord | Apr. 22, 1930 |
| 1,779,271 | Dibble | Oct. 21, 1930 |
| 1,859,542 | Trusty | May 24, 1932 |
| 1,889,925 | Leininger | Dec. 6, 1932 |
| 1,918,419 | Needham | July 18, 1933 |
| 2,192,033 | Dalton | Feb. 27, 1940 |
| 2,446,092 | Lait | July 27, 1948 |
| 2,446,410 | Couse | Aug. 3, 1948 |
| 2,449,146 | Ryan | Sept. 14, 1948 |
| 2,501,112 | Webster | Mar. 21, 1950 |
| 2,539,346 | Feist | Jan. 23, 1951 |
| 2,575,564 | Rinkel | Nov. 20, 1951 |